Nov. 8, 1960 L. H. MORIN 2,958,972
MOLDED PLASTIC SPOOL FOR LABEL ATTACHMENT
Original Filed Aug. 23, 1956
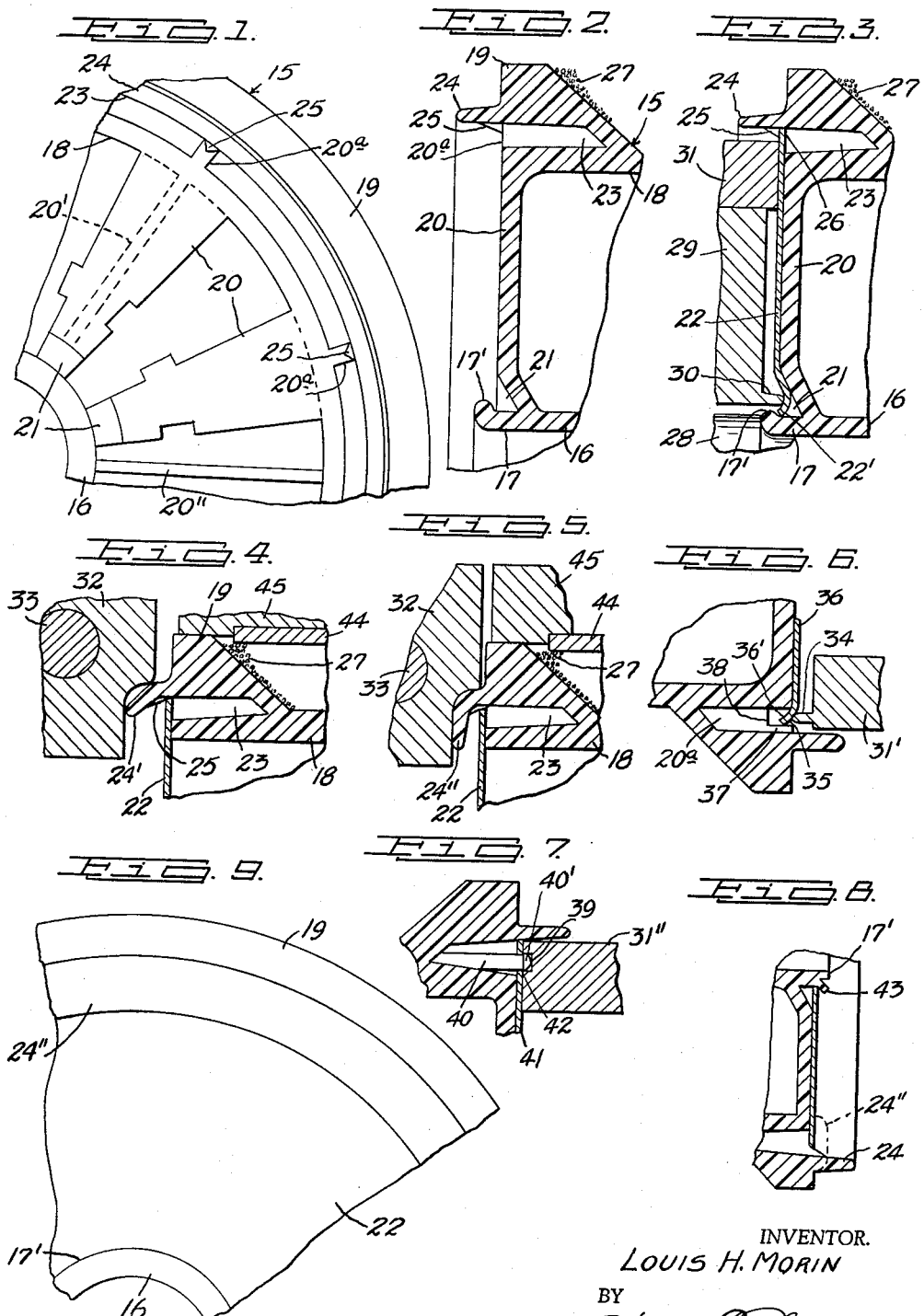
INVENTOR.
LOUIS H. MORIN
BY
ATTORNEY

United States Patent Office 2,958,972
Patented Nov. 8, 1960

2,958,972

MOLDED PLASTIC SPOOL FOR LABEL ATTACHMENT

Louis H. Morin, Bronx, N.Y., assignor to Coats & Clark Inc., New York, N.Y., a corporation of Delaware Original application Aug. 23, 1956, Ser. No. 605,837. Divided and this application Oct. 16, 1958, Ser. No. 767,724

13 Claims. (Cl. 40—309)

This invention relates to plastic spools, upon which thread or other strands are wound. More particularly, the invention deals with a molded spool structure, wherein means is provided for first temporarily retraining labels on end walls thereof, preparatory to shaping the spool by suitable tools to definitely retain the labels upon the spool ends.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a small sectional portion of one end of a spool made according to my invention and illustrating part of the background showing.

Fig. 2 is a sectional detail view through a part of one end portion of the spool, illustrating the result of shaping the central tubular portion of the spool for retention of the central apertured portion of a label.

Fig. 3 is a view, similar to Fig. 2, diagrammatically illustrating part of the mechanism for applying the label to the spool end in temporarily maintaining the label in position.

Figs. 4 and 5 are diagrammatic sectional views showing an intermediate and finished stage of shaping the label retaining flange of the spool in retaining the label against displacement from the spool end.

Fig. 6 is a diagrammatic sectional view, illustrating a modified method of temporarily retaining the periphery of a label in position on the spool end.

Fig. 7 is a view similar to Fig. 6 showing another method of temporarily securing a label in position on the spool end.

Fig. 8 is a sectional view showing another modified method of temporarily retaining a label on the spool end and indicating, in dotted lines, the inturning of the flange for definitely retaining the label on the spool end; and Fig. 9 is a small end view of one end of a finished spool, illustrating the label definitely retained in position on the spool end.

This application is a division of my prior application Serial Number 605,837, filed August 23, 1956 and relates to subject matter disclosed in a companion application for spool structure Serial Number 605,836 now abandoned, filed of equal date with the preceding application.

In view of the fact that both end portions of the spool structure made according to my invention are the same, I have, in the accompanying drawings, illustrated portions of one end only of the spool structure in order to simplify the disclosure. However, in Fig. 1 of the drawing, as later described, part of the opposed end portion of the spool structure is indicated.

In Figs. 1 to 5, inclusive, I have shown, in part, a spool 15, comprising a central tubular portion, indicated in part at 16, having protruding ends, one of which is indicated at 17. At 18 is indicated the barrel portion, including the rim ends, one of which is shown at 19, the latter joining the tubular portion 16 in circumferentially spaced ribs or wall portions, two of which are indicated at 20 in Fig. 1 of the drawing.

Predetermined circumferentially spaced wall portions 20 at one end have inwardly extending radial ribs, one of which is indicated at 20' in dotted lines in Fig. 1; whereas, the opposed end walls of the spool have similar ribs, one of which is indicated at 20'' in Fig. 1 of the drawing. The ribs 20', 20'' extend from the tubular portion 16 to the barrel portion 18, as will be apparent. It will be noted that the wall portions or ribs 20 are set inwardly adjacent the tubular portion 16, as noted at 21, to provide clearance for tools and flexure of a label 22, as indicated in Fig. 3 of the drawing. This operation will be described in detail later.

The rim portion 19 of the spool ends, beyond the barrel portion 18, has an annular recess 23 and radially outwardly of the recess of the rim 19 has an outwardly projecting flange portion 24, the inner surface of which, adjacent the outer end of the recess 23, includes an inwardly projecting V-shaped label engaging prong or rib 25, these prongs being spaced at circumferential intervals at the spool end, as indicated in Fig. 1 of the drawing.

More particularly, each prong 25 extends longitudinally outwardly of a rib, such as the rib 20a, these ribs 20a being spaced circumferentially of the end wall of the spool, as indicated, in part, in Fig. 1 of the drawing. The prongs 25 are adapted to engage the peripheral edges of the label 22, as indicated at 26 in Fig. 3 of the drawing, in aiding temporary support of the label on the end of the spool. As noted in Figs. 2 and 3, as well as in other figures, the winding of thread is diagrammatically illustrated on the barrel and rim portion of the spool at 27.

The first step in the attachment of the labels to the spools consists in turning the protruding end 17 of the tubular portion 16 over by use of a suitable tool to slightly enlarge or bead said end, as indicated at 17' in Figs. 2 and 3 of the drawing, part of this tool being indicated at 28 in Fig. 3 of the drawing.

In addition to the tool 28, another tool or plunger sleeve 29 is employed for advancing the label 22 onto the end of the spool and, in this operation, the central aperture 22' of the label will be sprung over the bead 17' by an extending flange 30 on the plunger 29. This momentarily flexes the label into the recess 21, as clearly noted in Fig. 3 of the drawing.

Associated with the plunger 29 and enveloping the same is a ring 31 of any suitable material which extends beyond the end surface of the sleeve 29 and is adapted to engage the peripheral portion of the label 22 in forcing said peripheral portion onto the V-shaped prong or ribs 25 to positively and fixedly engage the peripheral portion of the label at circumferentially spaced intervals, thus retaining the label in substantially flat engagement with the end wall ribs 20 of the spool, as clearly illustrated in Fig. 3 of the drawing.

The above operation takes place preparatory to hopper or otherwise feeding of the spools with the labels attached as described to a mechanism employing tools for permanently attaching the labels to the spool ends.

Considering Figs. 4 and 5 of the drawing, I have indicated, in part, at 32 a forming tool or element, including a cartridge heater, as diagrammatically illustrated at 33, to heat the flange portion 24 and first partially shape the same as indicated at 24' in Fig. 4 and, finally, extend the same over the label 22, as indicated at 24" in Fig. 5 of the drawing, in retaining the label 22 against displacement from the spool end. As a result of this operation, the end product illustrated, in part, in Fig. 9 of the drawing, is produced and, in said figure, the flange portion is designated in its final form by the reference character 24", the beaded end of 17 and 17', part of the rim end 19 and the label 22. In other words, a neat and finished appearance will prevail at each end of the resulting spool.

In Fig. 6 of the drawing, I have shown a slight modification, wherein a ring 31', generally similar to the ring 31, is employed and modified to the extent of including an annular projecting rim 34 to force the peripheral edge 35 of a label 36 inwardly over prongs or ribs, one of which is shown at 37 in said figure. The rib 37 is generally similar to the rib 25 insofar as location is concerned, but is formed by recessing the outer ends of the ribs 20a of the spool, as indicated at 38 in Fig. 6 of the drawing. It will, thus, be seen that the rim 34 on the ring 31' forces the peripheral edge of the label 36 over the rib 37 and into the recess 38, as indicated at 36'. As the spool illustrated in Fig. 6 of the drawing is otherwise similar to the spool 15 shown in Figs. 1 to 5, inclusive, no further detail description thereof is deemed to be necessary.

In Fig. 7 of the drawing, I have shown a still further modification, wherein 31" represents a ring, similar to the ring 31, having an annular recess 39 in its outer surface to engage and head-over one of a number of projecting ribs or pins 40 constituting part of the spool and adapted to pierce the peripheral portion of a label 41, as indicated at 42. The pins 40 are normally pointed to pierce the label 41 and are then headed-over, as seen at 40' by the recessed forming portion 39 of the ring 31".

Here again, as the spool shown in Fig. 7 is otherwise similar to the spool 15, shown in Figs. 1 to 5, inclusive, no further detail description of the spool is considered to be necessary.

Now considering the structure shown in Fig. 8 of the drawing, here the spool structure is again generally similar to the spool shown in Figs. 1 to 5, inclusive, and is modified solely to the extent of forming an annular rim or bead 43 on the protruding end 17 by insertion of a tool into the end 17 to shear and spread said end sufficiently to form the rim or bead 43, which otherwise performs the same function as the bead 17' of the structure shown in Figs. 1 to 5, inclusive.

In Fig. 8, the flange portion 24 is shown in its extended position in full lines and in its operative or label retaining position in dotted lines at 24". As the spool of Fig. 8 is otherwise of the same structure as the spool shown in Figs. 1 to 5, inclusive, no further detail description will be given.

In Figs. 4 and 5 of the drawing, I have shown, in part, a spool feed belt 44, upon which bears a weighted rim 45 for definitely positioning the spools at the forming stations in accordance with the teachings in the original application.

With the several forms of spool structures disclosed, it will appear that, in all cases, means is provided on the ends of the spool to engage the central apertured portion 22' of a label, as well as the peripheral portion thereof in temporarily retaining the labels in position on the spool ends, preparatory to performing the operation upon the flange portion 24 to shape the same inwardly upon the periphery of the label 22, as indicated, for example at 24".

Having fully described my invention, what I claim as new and desire to secure by Letters Patent is.

1. A molded plastic spool having means, at end portions thereof, adapting the spool for automatic mounting and securing of labels to end portions thereof, said spool comprising a central tubular portion having protruding ends extending beyond end wall portions of the spool, the ends of the spool having, adjacent the periphery thereof and extending beyond said end wall portions, formable label securing means, the spool ends, adjacent said last named means, including circumferentially spaced label engaging means, said label engaging means, in combination with enlargements formed on the protruding ends of the central tubular portion, providing means for temporarily retaining labels upon ends of the spools, and said formable means of the spool ends being adapted to be shaped inwardly upon peripheral portions of labels mounted on the spool ends in retaining the labels against displacement from said spool ends.

2. A spool as defined in claim 1, wherein the end wall portions are recessed adjacent and radially outwardly of the protruding ends of the central tubular portion to provide clearance for flexure of the labels over the enlargements of said protruding ends.

3. A spool as defined in claim 1, wherein the formable means at the spool ends comprises annular flange portions.

4. A spool as defined in claim 1, wherein said circumferentially spaced label engaging means comprises prongs.

5. A spool as defined in claim 1, wherein said circumferentially spaced label engaging means comprises V-shaped prongs.

6. A spool as defined in claim 1, wherein the enlargements of the protruding ends comprise annular beads.

7. A molded plastic spool, to the end portions of which labels are adapted to be temporarily and permanently attached, said spool comprising a central tubular portion, a barrel portion joining the tubular portion in circumferentially spaced end wall portions, ends of the spool having rims, end surfaces of the rims having projecting flange portions, the tubular portion including protruding ends, said rims having a circumferential recess, means spaced circumferentially of said recess for engaging the periphery of a label, said end wall portions having, adjacent the central tubular portion, an annular recess on outer surfaces thereof, and means, on the protruding ends of the tubular portion, for engaging a central apertured portion of a label disposed upon outer surfaces of said end wall portions.

8. A spool as defined in claim 7, wherein the central tubular portion and barrel portion are joined at end portions of the spool in circumferentially spaced radial ribs.

9. A spool as defined in claim 8, wherein the radial ribs, at one end of the spool, are in spaced relation to the radial ribs at the opposed end thereof.

10. A spool as defined in claim 7, wherein the first named means comprises circumferentially spaced pins.

11. A spool as defined in claim 7, wherein the first named means comprises circumferentially spaced ribs, including label engaging portions.

12. A spool as defined in claim 11, wherein said label engaging portions comprise V-shaped prongs.

13. A thread spool comprising an inner tube, an outer thread-holding barrel having thread-retaining enlarged rim end portions, and a pair of end walls; each end wall comprising a group of end wall portions joining the tube and barrel together, said end wall portions being of substantial width and having outer label-supporting surfaces that are distributed throughout said end wall; a circumferentially extending label-retaining flange on each rim end portion extending outwardly of the end wall; a plurality of circumferentially spaced grooves in said rim end portion between the barrel and said flange and opening through said end wall; a rib between each pair of next adjacent grooves; label-engaging means on the outer end of each rib for temporarily supporting an apertured label on said end wall by engaging the outer periphery of the label; said inner tube extending outwardly beyond said end wall for a relatively short distance and terminating in a free end having a beaded edge; said end wall portions joining the inner tube through inwardly bent portions, thereby forming a notch between the tube and each said bent portion, said tube terminating in a free end having a beaded edge, the aperture-defining portion of the label being adapted to be sprung over the beaded edge of the tube and to extend into said notches, the combination of the beaded edge of the tube and said notches thereby serving to temporarily support said apertured label on said end wall; said label-retaining flange being adapted to be bent over onto outer peripheral portions of the label to permanently hold the label in place, and said bent over flange covering said label-engaging means and said ribs and grooves.

No references cited.